United States Patent [19]

Carbone, Jr. et al.

[11] Patent Number: 5,517,519

[45] Date of Patent: May 14, 1996

[54] APPARATUS FOR REPOWERING AND MONITORING SERIAL LINKS

[75] Inventors: Quiedo J. Carbone, Jr., Kingston; Gerald H. Miracle, Pleasant Valley, both of N.Y.; Peter L. Potvin, Holly Springs, N.C.

[73] Assignee: International Business Machines Corporation, Armonk, N.Y.

[21] Appl. No.: 76,027

[22] Filed: Jun. 14, 1993

[51] Int. Cl.⁶ .............................. H04M 15/00; H04B 3/36
[52] U.S. Cl. ........................ 375/211; 379/113; 379/114; 379/133; 379/344
[58] Field of Search ..................................... 375/211, 213; 379/113, 133, 344, 114, 338; 370/13.1; 340/425.1

[56] References Cited

U.S. PATENT DOCUMENTS

| | | | |
|---|---|---|---|
| 3,916,123 | 10/1975 | Werner et al. | 379/113 |
| 4,022,978 | 5/1977 | Connell et al. | 379/113 |
| 4,334,303 | 6/1982 | Bertin et al. | 370/13 |
| 4,486,739 | 12/1984 | Franaszek et al. | 341/59 |
| 4,710,976 | 12/1987 | Wakabayashi et al. | 375/213 |
| 4,975,916 | 12/1990 | Miracle et al. | 371/47.1 |
| 5,042,027 | 8/1991 | Takase et al. | 379/133 |
| 5,107,489 | 4/1992 | Brown et al. | 370/58.2 |
| 5,406,555 | 4/1995 | Yoshida | 379/113 |

FOREIGN PATENT DOCUMENTS 63-136736   6/1988   Japan.

OTHER PUBLICATIONS

"Telephone Call Connection Monitor for a Telephone Billing System", *IBM Technical Disclosure Bulletin*, vol. 30, No. 4, Sep. 1987, pp. 1688–1691.

Enterprise Systems Architecture/390, Escon I/O Interface IBM publication SA22-7202-02.

*Primary Examiner*—Stephen Chin
*Assistant Examiner*—Jeffrey W. Gluck
*Attorney, Agent, or Firm*—Lynn L. Augspurger

[57] ABSTRACT

A computer system employs a repeater unit which repowers a serial channel link. The repeater unit also monitors and records non-idle usage and errors for both directions of the repeated serial link. Non-idle usage of the serial link is recorded as a number of seconds that non-idle traffic flowed in the link over a given period of time. Link serial code violations and loss-of-light transitions are also counted. Link code violations are counted with an accuracy that permits targeted serial link bit-error rates, of no more than one bit error in approximately two months, to be accurately verified for the first time in a normal customer environment. The repeater unit permits an attached monitoring computer to read and reset all its usage and error counters as often as required by the customer, and without losing any counts of any counted event. The attached monitoring computer can also instruct the repeater unit to send certain diagnostic patterns or no-light and/or perform a remote wrap function to assist with link problem determinations.

11 Claims, 5 Drawing Sheets

APPARATUS FOR REPOWERING AND MONITORING SERIAL LINKS

FIELD OF THE INVENTION

This invention relates to data processing apparatus and more specifically to an apparatus that repowers and monitors traffic on a serial link of the ESCON and FCSI(FCS)type.

GLOSSARY OF TERMS

While dictionary meanings and commonly used meanings are also implied by certain terms used here, the following glossary of some terms may be useful.

| | |
|---|---|
| ESCON | ESCON, as used herein, is based upon the Enterprise Systems CONnection Architecture, IBM S/390, but more broadly defines a computer systems connection whereby the computer system can execute a channel program for data transfers and transfer data over a serial interface connecting the serial channel with a serial control unit or another serial channel which conforms to a predetermined protocol across a right-of-way pathway which may be distributed through lines that are limited to specific traffic and, also, through common carrier lines of the kind offered by a RBOC. |
| RBOC | Regional Bell Operating Company |
| Serial Link | Connects two serial computer components, and provides a bidirectional path between the two components via a serial data conductor in each direction. |
| Multi-mode fiber-optic | The type of fiber-optic conductor driven by an LED transmitter. |
| Single-mode fiber-optic | The type of fiber-optic conductor driven by an LASER transmitter. |
| Code Violation (CV) | An invalid bit configuration for a character transmitted on the serial link. |

REFERENCES USED IN THE DISCUSSION OF THE INVENTION

During the detailed description which follows the following works will be referenced as an aid for the reader. These additional references are:

"IBM Enterprise Systems Architecture/390 ESCON I/O Interface", IBM manual number SA22-7202. This publication will be cited as "ESCON" or "ESCON Architecture". This Architecture will encompass the similar functions performed by like serial link architectures now developed like the Fiber Channel System Initiative (FCSI) and others which will be developed in the future for linking computer system elements.

U.S. Pat. No. 4,486,739, issued to Franaszek, et. al., on Dec. 4, 1984 defines the serial characters flowing on the serial link in accordance with the invention we have developed. We have cited this patent as the "8/10X code" or "8/10 transmission code".

U.S. Pat. 4,975,916, issued to Miracle, et. al. on Dec. 4, 1990 describes synchronization to the serial characters being repowered through the serial link. This patent will be referenced in the text as "character sync".

U.S. Pat. No. 5,107,489, issued Apr. 21, 1992, to P. J. Brown, et al., relating to the "Serial Link Protocol for Forming Dynamic Connections" is an example of one of many patents illustrating other aspects of the ESCON and FSCI.

These additional references are incorporated by reference.

BACKGROUND OF THE INVENTION

A general object of this invention is to provide a new and improved apparatus for repowering and monitoring the traffic on an ESCON serial link. Serial link repowering apparatus introduced earlier provide background information that is useful in understanding our invention.

ESCON originates from the IBM named Enterprise Systems CONnection for serial links via fiber-optic channels. It has become a widely adopted protocol for network communication. It is used by IBM and others. Typical networks utilize, IBM's SNA traffic, however, other protocols can be supported. IBM has developed protocols and prototypes for T3-capable communications that allow host to host data transfer for MCI Communication Corp. Recently, Hewlett-Packard and Sun Microsystems have joined IBM to promote a Fiber Channel Systems Initiative (FSCI) as a multivendor standard for linking host devices with each other and with high capacity storage devices. The proposed Fiber Channel Standard and ESCON are functionally similar. Normally, for IBM compatible systems ESCON is used, while FSCI will be used for channel-speed applications involving incompatible hosts and peripherals. Several Regional Bell Operating Companies (RBOC) have ESCON turnkey services that let users interconnect mainframes and peripherals. The FCSI and ESCON allow the carriers to choose either protocol for functionally similar applications and for channel-extension applications. These channels enable connection to be made for great distances and between distributed and clustered systems (SYSPLEX).

ESCON, as used herein, refers to a serial connection system in which dynamic connections are established in a serial link between computer system devices. The connections make use of serial links of multi-mode fiberoptic or single-mode fiber-optic pathways. ESCON, as used herein, encompasses the same functions achieved by any fiber channel interface between systems, including the FCSI, which permits a computer system to execute a channel program for data transfers via a serial interface connecting the serial channel with another serial component which conforms, directly or indirectly, to a predetermined protocol for transfers across a right of way between system elements. The right of way is the pathway over which the data transfers via serial links of multi-mode fiber-optic or single-mode fiber-optic ribbons. ESCON is used herein as the common name, since the standard by which this serial connection system was developed was originated by IBM in its Enterprise System CONnection program. As indicated, this program has been expanded, and now allows disparate elements (heterogeneous systems) to be coupled. The current ESCON Architecture is defined by the referenced "IBM Enterprise Systems Architecture/390 ESCON I/O Interface", IBM manual number SA22-7202.

As a protocol, connections are made by the use of frames each having a beginning of frame delimiter, an end of frame delimiter, an identification of the source, and an identification: of the destination of the requested connection. The delimiters may initiate a connect or a disconnect operation between the source and the target. The connections are made through a dynamic switch so as to operate the link in one of simplex, half duplex or full duplex modes dependent on the number, direction and type of frannes. An example of one of the patents illustrating ESCON is the referenced U.S. Pat. No. 5,107,489, issued Apr. 21, 1992, to P. J. Brown, et al., relating to the "Serial Link Protocol for Forming Dynamic Connections."

In spite of the great advances being made, no one has solved the problems which can originate on right of ways, especially those right of ways that involve common carrier links. Some of those problems, which will be detailed in the detailed description overview, have been solved by the present invention, which relates to an ESCON and FSCI type link.

IBM built a very limited number of prototype fiber-optic serial link repowering apparatus during the period 1988 to 1993 with a codename of "PARROT". These PARROT prototypes were installed in a very limited number of customer accounts to solve a specific problem of a single ESCON serial link being shorter than the customer's required distance. The PARROT repeater apparatus repowered the serial bit stream, indicated that no-light was being received in either direction, and offered a remote wrap capability that transmitted what was received from a link back into that same link, including the wrapping of no-light received to no-light transmitted. A PARROT has also been built after our invention to convert from a single-mode (LASER) link to a multi-mode (LED) link. These PARROT apparatus could not indicate that 8/10 code violations (CV's) were being received, that a serial link is being used for transmitting something other than ESCON 8/10 codes (e.g.— voice), could not measure non-idle usage of the link, and could not generate and transmit any serial bit streams for diagnostic purposes.

A serial fiber-optic repeater is commercially available as the IBM multi-port 9032 or 9033 ESCON Director. Configuring a pair of pods as a dedicated or "static" connection would repower the ESCON serial data and could also convert from multi-mode to single-mode similar to the PARROT. Diagnostic capabilities exist for a director pod to transmit no-light, idles or any of the four special continuous sequences defined by the ESCON Architecture. The director can also configure a pod into remote wrap mode similar to the PARROT, except that a director pod cannot remote wrap no-light received to no-light transmitted. Additionally, the director can detect that CV's are being received to the extent that the ESCON-architected bit-error-rate (BER) threshold has been exceeded, but the director cannot count the exact number of CV's that have been detected. The BER threshold exceeded indication cannot be used to determine whether the serial link is being used to transmit other than ESCON characters. The director is incapable of measuring nonidle usage of the ESCON link.

SUMMARY OF THE INVENTION

Our invention deals with the use of an apparatus for repowering a serial link. The references use various names for such apparatus. In the following description, apparatus that is connected between two serial components for the purpose of repowering the serial link will be called the repeater unit (or repeater).

The improvements which we have made achieve

The ability to measure the non-idle usage over a period of time for each direction of the serial link, and The ability to count the exact number of CV's detected in each direction of the serial link.

The independent abilities both to transmit various diagnostic patterns in both directions of the serial link and to transmit toward a direction of the serial link whatever is being received from that same direction.

These improvements are accomplished by providing a means to interrogate the serial characters being repeated in both directions, but without disturbing the repeated serial bit streams. The interrogated repeated characters are tested for being valid characters or code violations (CV's). If the repeated characters are valid, then they are tested for being idle or non-idle. A hardware device is used to count the CV's and non-idle characters. A microprocessor (MP) periodically reads and resets the CV counts and adds these counts to its accumulated CV counters. The hardware device can count exactly one second's worth of non-idle repeated characters in each direction of the link, and then indicate this to the MP.

After the MP detects that a second's worth of non-idle usage has been accumulated, then the MP will reset this hardware indication and will add one to its corresponding seconds count.

An attached local monitoring computer (LMC) will periodically poll the repeater to read and reset its CV counts and seconds counts, The LMC will add the counts read from the repeater to its own accumulated CV counts and non-idle usage seconds counts. The LMC thresholds the total CV counts read over a period of time, and alerts the owner of the repeater and repeated link that link problem determination should be initiated if a CV threshold is exceeded. It is possible, with our invention, to initiate this link problem investigation before the problem becomes apparent to the end-point customers that own the serial components at the ends of the repeated link. Reading and resetting the accumulated seconds of non-idle usage permits the owner of the repeater and repeated link to bill the end point customers a base rate for the link itself plus an additional rate for the amount of non-idle usage during the billing period. If the repeated link connects a server to a client, then the server could/would bill the client for service based on the number of non-idle usage seconds accumulated during the billing period.

The LMC can instruct the repeater to transmit certain diagnostic patterns both to assist in the testing of other attached repeaters and to assist during link problem determination. The LMC can also instruct the repeater to remote wrap whatever is received from a particular direction of the link back toward that same direction.

These and other improvements are set forth in the following detailed description. For a better understanding of the invention with advantages and features, refer to the description and to the drawings.

Figure 1:
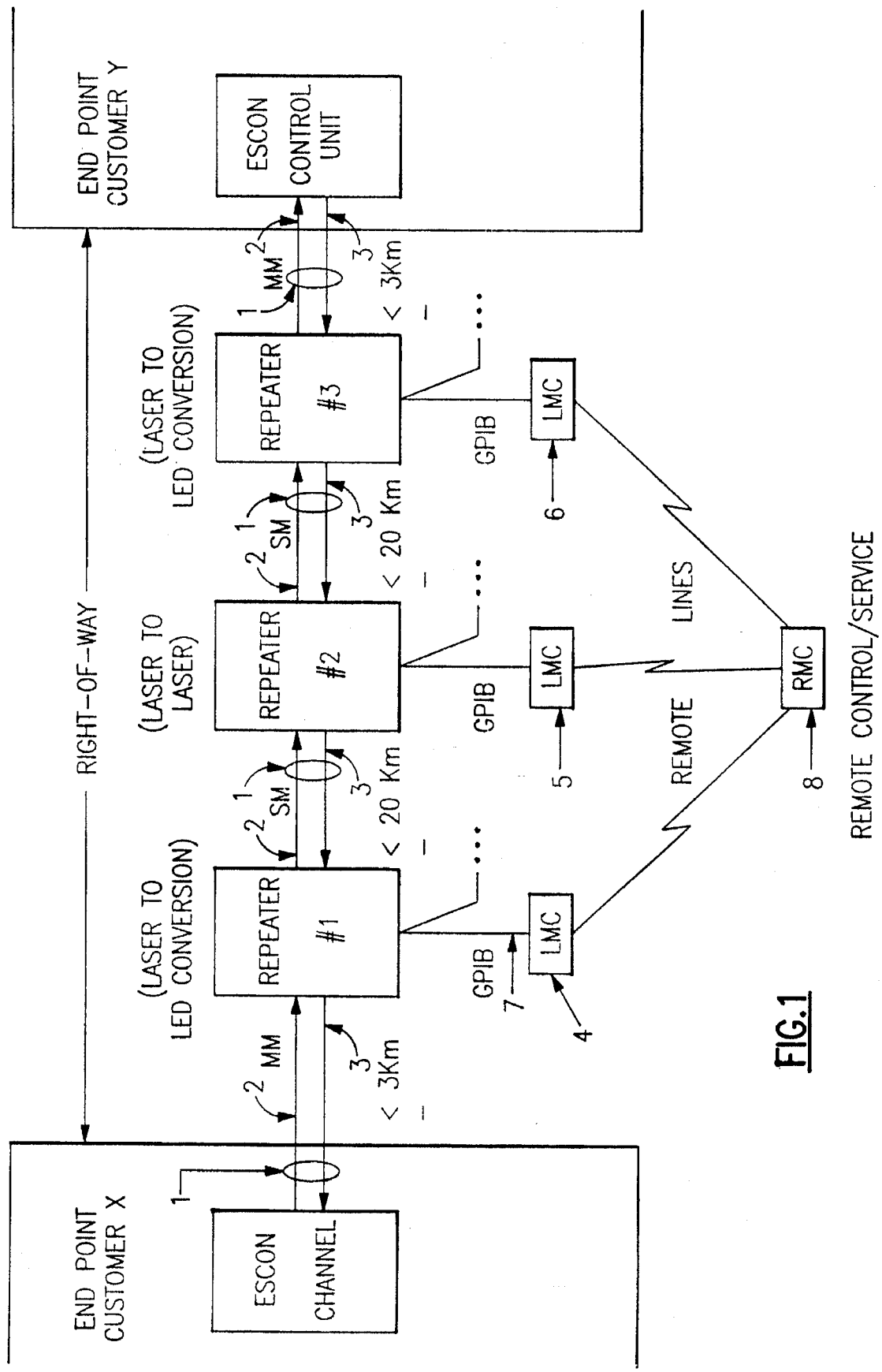
FIG. 1 is an overview of a repeater configuration example showing multiple repeaters in the repeated link between the two end-point customers.

Our detailed description explains the preferred embodiments of our invention, together with advantages and features, by way of example with reference to the following drawings.

DETAILED DESCRIPTION OF THE INVENTION

Before considering our preferred embodiments in detail, it may be worthwhile to illustrate, by way of example, some of the typical problems encountered in developing systems, before detailing the preferred embodiment of our invention. The repeater enables ESCON channel links connecting end-point customers to cross a non-owned right-of-way, which is usually owned and controlled by a Regional Bell Operating Company (ROBC). The RBOC's provide voice, video and data networking services across their right-of-way for their (end-point) customers, and the RBOC's require the ability to monitor and control the usage of these serial links passing through their rights-of-way. Our invention solves the following problems:

1. Conversion and Distance

Problem: End-point customers usually have multi-mode fiber optic conductors which are driven by LED's and which have a maximum distance restriction of three kilometers. The distance required to cross an RBOC right-of-way may exceed three kilometers. The fiber optic conductors crossing the RBOC right-of-way are usually single-mode conductors which must be driven by LASER's. A LASER transmitter can generally drive a maximum of 20 kilometers of single-mode fiber optic conductor.

Solution: Our repeater reshapes and redrives the serial bit stream for the ESCON links, and also provides conversion between multi-mode fiber optic cables driven by LED's and single-mode fiber optic cables driven by LASER's. Hence, the repeater may be configured as LED-to-LASER, LASER-to-LASER or LED-to-LED. A plurality of repeaters (e.g. three) may be inserted in a single ESCON link, allowing the connected end points to be located up to 80 kilometers apart if all of the repeaters are LASER-to-LASER.

2. Bypass Detection

Problem: An RBOC can lose revenue if their customer leases fiber optic conductors for ESCON digital transmissions and instead uses them to transmit voice data. This practice is commonly referred to as "bypass". The contract entered between the RBOC and its end-point customers would specify that the leased fiber optic conductors will be strictly used for digital transmissions associated with an ESCON link.

Solution: Our repeater is designed to repeat a fiber optic bit stream with a nominal frequency of 200 megabits per second. The repeater monitors the repeated serial data for valid ESCON encoded 10-bit transmission codes, and will detect a code violation (CV) if a non-ESCON character is detected. The repeater counts the number of CV's detected in both directions of the link. Each of these two CV counters can count up to 16,777,215 CV's. A CV counter will freeze if its maximum value is reached. Both CV counts are made available to an attached (local) monitoring computer. The RBOC can use the local monitoring computer to read, display and reset the CV counts from any attached repeater.

The targeted bit-error-rate (BER) for an ESCON link is no more than one bit error every $10^{**}15$ bits. The repeater can only count CV's, and cannot detect or count individual bit errors. A CV is assumed to have only one bit in error, because multiple bit errors within a single 10-bit transmission code may not result in a CV. Our repeater is believed to be the first device that can count CV's with the accuracy required to detect whether or not an ESCON link is meeting its targeted BER.

The ESCON Architecture defines that a bit-error-rate (BER) threshold has been exceeded for a serial dynamic switch pod if at least 12 CV "bursts" occur within a five-minute period, and our repeater is designed according to this same specification. A CV burst is defined as one or more CV's occurring within a 1.5-second sample period. The repeater detects whether this architected BER threshold has been exceeded for both directions of the link, and makes this additional information available to be read and reset by the local monitoring computer. The repeater contains two CV indicators visible to service personnel, one indicator for each direction of the link. If either direction of the link detects at least one CV within a 1.5-second sample period, then the repeater will light the corresponding indicator for a period of 1.5 seconds. These CV indicators will be useful to service personnel during link problem determination and repair.

Voice data is normally digitized at a much lower bit frequency than ESCON data, which should cause nearly continuous CV's to be detected by a repeater. The number of CV's counted should be orders of magnitude more than the ESCON architected BER threshold, and the CV indicators should be on continuously. These physical indications and the large counts of CV's read by the local monitoring computer should alert the RBOC to the possibility that non-ESCON data (e.g.—voice) is being transmitted through the link.

3. Monitor Link Errors

Problem: To achieve a high degree of customer satisfaction, an RBOC must be cognizant of any errors or outages on the ESCON links crossing its right-of-way. If a link failure requires corrective action by the RBOC, then this corrective action must be undertaken as soon as possible. Ideally, an RBOC could be already working to correct a link problem before the problem is noticed by its end-point customers.

Solution: In addition to counting CV errors as described above, our repeater also detects for each direction of the link the following other error information which is useful for link problem determination. All this error information can be read by a local monitoring computer for usage by the RBOC:

Loss-Of-Light (LOL) condition: An LOL condition is detected if the optical signal deteriorates below a predetermined threshold or if all zero bits are being received.

LOL count: The repeater counts up to 255 off-to-on transitions of LOL. An LOL counter will freeze if its maximum value is reached. An attached local monitoring computer can read, display and reset the LOL counts.

Loss-Of-Sync (LOS) condition: LOS is detected because CV's are occurring too frequently, and LOS is reset after a significant number of error-free 10-bit transmission codes are received. An LOS condition is detected if four or more CV's are detected within 46 or fewer 10-bit transmission codes received. Receiving forty-five consecutive non-CV 10-bit transmission codes resets LOS.

Not-Operational Sequence (NOS): The ESCON architecture specifies that an ESCON serial component must transmit NOS if a link failure is detected. A link failure is defined as reception of either LOL or LOS for more than one second. Reception of NOS by a repeater could be caused by this same repeater being unable to transmit the repeated serial data into this link. Therefore, the repeater itself could be the cause of the link problem if NOS is being received.

Offline Sequence (OLS): The ESCON architecture specifies that an ESCON serial component must transmit OLS while offline, immediately after powering on, and immediately prior to powering off. Correctly transmitting OLS will prevent a receiving serial component from detecting a link failure as a result of receiving LOL from the powered-off serial component. The RBOC can also instruct an attached local monitoring computer to instruct an attached repeater to transmit OLS into one or both links as a link problem determination debug aid.

4. Measure Bandwidth Usage

Problem: An RBOC may wish to bill its end-point customers for usage of the ESCON link similar to telephone billing, with a base charge plus a usage charge. One end-point customer may be providing a server function for the other end-point customer and wishes to bill similarly for the base link hookup plus usage of the link.

Solution: The owner of a repeater can monitor both directions of a repeated ESCON link for non-idle usage. The ESCON architecture specifies that idle characters will be transmitted between the serial "frames". A frame consists of a start-of-frame delimiter, the frame contents data-type characters, two CRC data-type characters, and an end-of-frame delimiter. The frame delimiters consist of multiple "K-characters", which are link control characters and are not data-type characters. The idle characters between frames are also K-characters and are defined as K28.5 characters. Except for a K28.5 character that begins a certain start-of-frame delimiter and ends a cedain end-of-frame delimiter, all characters associated with a frame are considered non-idle characters by the repeater. The repeater considers all K28.5 characters as idle characters. The repeater counts the number of second's worth of non-idle characters that flow in both directions in the link. Since each ESCON 10-bit serial character is nominally 50 nanoseconds in duration, then for every 20 million repeated non-idle characters, the repeater will accumulate one second's worth of nonidle usage. The repeater can accumulate up to 16,777,715 seconds (approximately 27.7 weeks) of non-idle usage in each direction. A seconds counter will freeze if its maximum value is reached. An attached monitoring computer can read, display and reset the repeater's two seconds counters. If link usage is to be billed on a monthly basis, then the billing can be calculated per the number of non-idle seconds accumulated by the repeater for both directions of the link over a period of one month.

The ESCON architecture defines certain special continuous sequences (SCS's) that are used for notifying an ESCON component that an unusual condition either has occurred or is about to occur. An SCS is defined as a K28.5 character alternating with a particular data-type character (referred to as an "ordered-pair"), and the particular datatype character used defines which SCS is being transmitted. A minimum of eight consecutive identical ordered-pairs must be received in order to be deemed a valid SCS. The following SCS's are defined:
—Offline Sequence (OLS),
—Not-Operational Sequence (NOS),
—Unconditional Disconnect Sequence (UD), and
—Unconditional Disconnect Response Sequence (UDR).

The UD and UDR sequences are transient in nature, and are used for link recovery. The OLS sequence indicates that an ESCON component is offline, and the NOS sequence indicates that a link failure was detected. An OLS or NOS sequence may last indefinitely. When any SCS begins, then the repeater will count the data-type characters that are part of the first eight ordered-pairs as non-idle usage, but will stop counting non-idle characters if a valid OLS or NOS sequence is received. No more non-idle characters will be counted as long as OLS or NOS persists. Since the UD and UDR sequences are transient in nature, then the repeater continues to count non-idle characters during any UD or UDR sequence.

If either direction of the link is receiving LOL or a CV, then no non-idle character will be counted for usage metering.

To summarize, each character being received in each direction of the repeated link will be counted for usage metering if:
—The character received is NOT a K28.5 character,
—LOL is not being received,
—A CV is not detected for this character,
—A NOS sequence is not being received, AND
—An OLS sequence is not being received.

5. Link Diagnostic Capabilities

Problem: Diagnostic capabilities are required both to be able to ascertain correct operation of other repeaters and to assist in problem determination of the link itself.

Solution: Our repeater has the ability to continuously transmit, under instructions from a local monitoring computer (LMC), the following diagnostic patterns independently in either direction or both directions of the serial link:

"OLS": Transmit OLS continuously.

good characters: Transmit continuously an alternating sequence of valid 8/10 transmission codes, half of which are idle (K28.5) characters and half non-idle characters (K28.6).

"LOS": Transmit continuously a repeated 8/10 transmission code (K28.6), which should cause CV's and LOS to be detected by the receiver. Repeating the same 8/10 transmission code having an unequal number of one bits and zero bits violates the rules of disparity for the 8/10 transmission codes. A CV is detected for either an invalid 8/10 transmission code or for a disparity error.

"remote wrap": Transmit on a first output line the serial bit stream that is being received on a second output line and/or transmit on a second output line the serial bit stream that is being received on a second input line, such that the repeater transmits back to a transmitter the serial bits stream sent to the repater by the transmitter.

No-light: Transmit no-light, which should result in the receiver detecting Loss-Of-Light (LOL).

The Preferred Embodiment

Turning now to our invention in greater detail, FIG. 1 illustrates a repeater configuration example showing a single ESCON link I passing through a maximum of three repeaters, with conversion from multi-mode (MM) to single-mode (SM) fiber optic cables. Repeaters #1 are both LED/LASER repeaters, and repeater #2 is a LASER/LASER repeater. Each fiber-optic cable contains two fiber optic conductors/paths (2&3), one for the serial traffic flowing from End-Point Customer X to End-Point Customer Y(2), and one for the serial traffic flowing from Y to X (3). The repeater technology may limit the maximum number of repeaters between two ESCON components, because of serial bit frequency "jitter". Each repeater derives its transmitted bit frequency from the frequency of the received serial bit stream, and each repeater will introduce a slight amount of bit jitter as a result of this serial repeater mechanism. The serial bit jitter introduced by each repeater becomes additive when multiple repeaters are cascaded back-to-back in a link.

The "LMC" (4, 5 or 6) is a Local Monitoring Computer (typically a Personal Computer or equivalent) that is attached to each group of repeaters that are located at the same site. The LMC communicates to its attached repeaters via an IEEE 488 industry-standard interface 7 that is also referred to as a General Purpose Instrumentation Bus (GPIB) interface. Using commercially available GPIB extender units, up to 196 (14×14) repeaters can be attached to a single LMC GPIB controller. Without GPIB extenders, a maximum of 14 repeaters can be attached to a single LMC GPIB controller. Using a defined set of GPIB "orders", the LMC can read and reset the accumulated error counts and non-idle usage seconds counts from any attached repeater. A Remote Monitoring Computer (RMC) 8 may be attached via remote links (such as modems and telephone lines) to multiple LMC's. The RMC provides a remote single point of control and service for all the repeaters owned by a particular right-of-way customer (typically an RBOC). The RMC can analyze error counts and status information read from its configured LMC's to determine the cause of a link problem, and dispatch personnel to repair the problem. At the end of each billing period, the RMC can read the non-idle usage seconds counts from all the repeaters attached to all its LMC's and generate the information required for billing purposes. All the same error information and usage seconds counts can also be obtained locally from an LMC, regardless of whether any remote link exists between the LMC and an RMC. This would be the likely mechanism used for backup if a remote link were down, or if an end-point customer owns one or more repeaters, needs to obtain error and usage information, and does not need to invest in an RMC.

Figure 2:
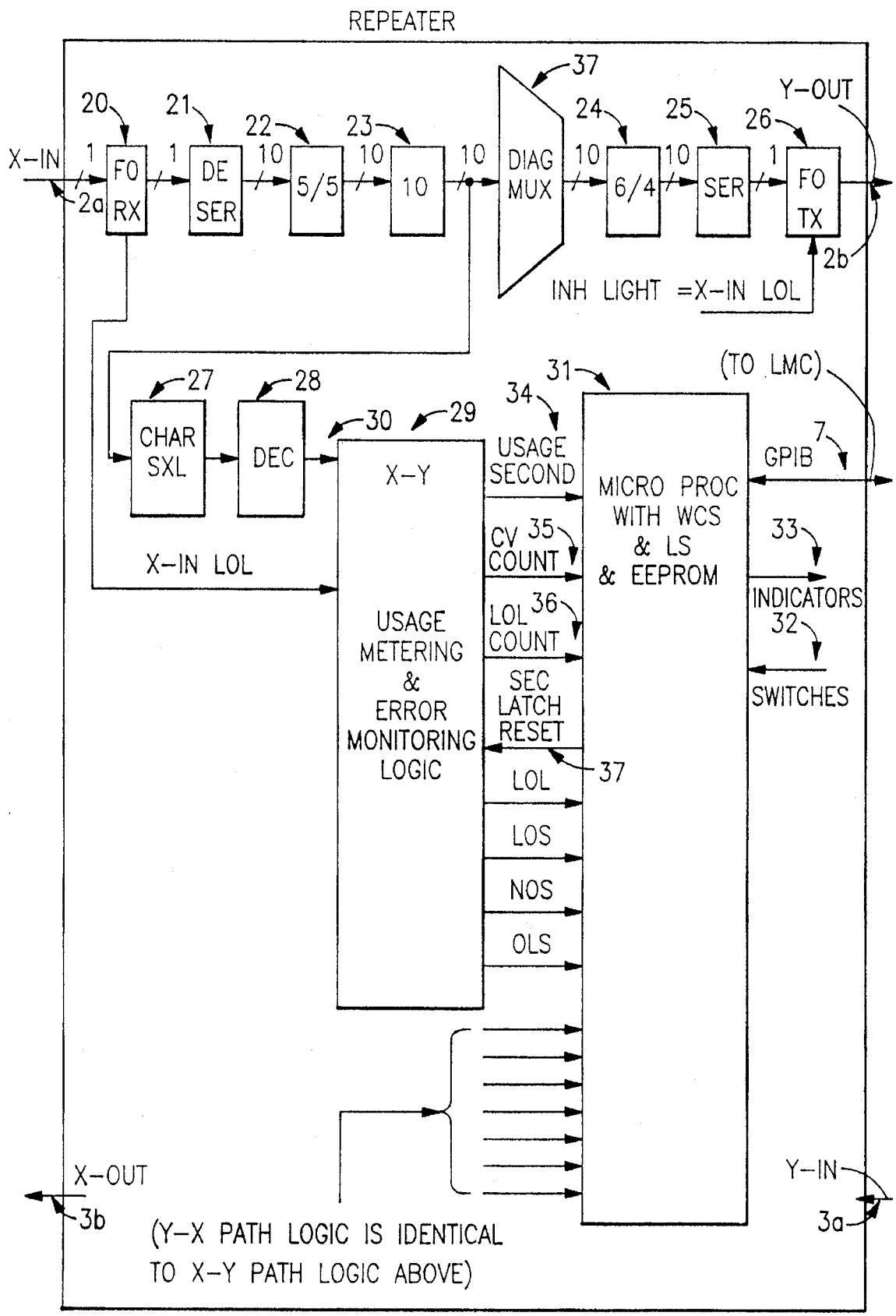
FIG. 2 is a block diagram of the preferred embodiment and particularly shows the repeated serial bit stream with the interrogation of the serial data being repeated.

Refer to FIG. 2 for a block diagram of our repeater. Two repeated serial paths, X-In-to-Y-Out (2a& 2b) and Y-In-to-X-Out (3a& 3b), pass through a repeater. All the hardware necessary to support the path X-In-to-Y-Out is also duplicated for the path Y-In-to-X-Out, and is not shown on the drawing. A fiber-optic serial bit stream 2a entering the repeater is received by a fiberoptic receiver (FORX) 20. The FORX 20 converts the optical signal to an electrical signal which is passed to the deserializer (DESER) 21. The DESER 21 deserializes consecutive groups of 10 serial bits, and passes these 10 parallel bits, 5 bits at a time, to a "5/5" staging register 22. The DESER 21 also generates a 20 MHz receiver clock (RCVCLK) derived from the 200 Mbits/sec serial bit stream. This 20 MHz RCVCLK has a nominal 50-nanosecond cycle and a symmetrical up-time and down-time. Each consecutive group of 5 deserialized bits is latched into the "5/5" register 22 by each consecutive plus-to-minus and minus-to-plus transition of the RCVCLK. This same RCVCLK is used to step the 10-bit groups from the "5/5" register 22 to the "10" register 23 to the "6/4" register 24 and into the serializer (SER) 25. The SER 25 synthesizes the 20 MHz RCVCLK back into a 200 M bits/sec frequency, which is used to serialize each 10-bit group back into an electrical serial bit stream, one bit every 5 nanoseconds. The connected fiber optic transmitter (FOTX) 26 converts the electrical serial bit stream to an optical serial bit stream 2b leaving the repeater, which is identical to the optical serial bit stream 2a that entered the repeater. LOL is propagated through the repeater by connecting the shown X-In LOL signal detected by the FORX 20 to the shown "INHIBIT LIGHT" signal entering the FOTX 26. INHIBIT LIGHT causes the FOTX 26 to shut off its output light, which propagates the received LOL condition through the repeater.

Since each consecutive group of 10 serial bits is stable for an entire 50-nanosecond RCVCLK cycle in staging register "10" 23, the output of this staging register "10" 23 is used for the metering/monitoring logic 29 that monitors for error conditions and non-idle usage. The 10 parallel bits first enter a character selector (CHARSEL) 27, which is capable of selecting any one of ten 10-bit "windows" within a stream of 19 chronologically consecutive bits. The selected 10-bit character enters a decoder (DEC) 28, which tests the character for being a valid 10-bit transmission code as defined by the ESCON architecture. If an invalid character is detected, then the DEC 28 outputs a code violation (CV) signal. If the frequency of CV's evolves into an LOS condition, then the DEC 28 will assume that character sync has been lost and will signal the CHARSEL 27 to "bump" to the next 10-bit window, as taught by the aforementioned U.S. Pat. No. 4,975,916. This process continues until the DEC 28 finds the correct 10-bit window and stops detecting CV's. If a CV is not detected, then the DEC 28 can successfully decode a 10-bit transmission code into a valid data-type character or K-character and output this information via bus 30 to the metering/monitoring logic 29. The metering/monitoring logic 29 receives LOL from the FORX 20 and receives CV, LOS, bits 0–7, bit K and a parity bit (for bits 0–7 and K combined) via bus 30 from the DEC 28. All the latches in the CHARSEL 27, DEC 28 and metering/monitoring logic 29 are clocked by the RCVCLK generated by DESER 21.

The metering/monitoring logic 29 counts a second's-worth (20,000,000) of non-idle characters, counts CV's, counts off-to-on transitions of LOL, and monitors the current states of LOL, LOS, NOS and OLS. The metering/monitoring logic 29 decodes the valid special continuous sequences NOS and OLS from the characters being received from DEC 28 via bus 30. If the metering/monitoring logic counts one second's worth of non-idle characters, then this is reported to an attached microprocessor (MP) 31 as a "usage-second" indication 34. After the MP 31 detects the usage-second indication, then the MP 31 will reset the usage-second indication and will increment a large (3-byte) seconds accumulation counter contained in its local storage (LS) registers (not shown). An increment to a seconds accumulation counter will be ignored if the counter has already reached its maximum value. The MP 31 can also read and reset the CV count 35 and LOL transition count 36 and can read the current states of LOL, LOS, NOS and OLS from the metering/monitoring logic 29. The MP 31 adds the CV and LOL transition counts read to larger CV and LOL transition accumulation counters also contained in its LS registers.

The stored program for the MP 31 is contained in a writeable control storage (WCS) of the microprocessor which is loaded from an electrically-eraseable PROM during a power-on reset initialization sequence. An attached LMC (4, 5 or 6 in FIG. 1) can load new microcode into the EEPROM via the GPIB interface 7. The MP 31 also contains a smaller ROM, which contains the code necessary to load the WCS during a power-on reset initialization sequence. An attached LMC can send a pre-defined "order" to the MP 31 via the GPIB interface 7. The MP 31 will execute the order and send a response back to the LMC via GPIB interface 7. This order mechanism is used by the LMC for all communications with all attached repeaters, such as the reading and resetting of error counts and usage information and the reading of status information. The MP 31 is able to read, via bus 32, configuration switches preset during installation to acquire its correct GPIB primary and secondary addresses. One additional switch is used to indicate that external wrap diagnostics through diagnostic wrap plugs should be executed during a power-on reset initialization sequence. Diagnostic wrap plugs are inserted into both the X side and the Y side of the repeater, and wrap the serial bit streams from Y-Out 2b to Y-In 3a and from X-Out 3b to X-In 2a. The MP 31 can control, via bus 33, indicators on the repeater to indicate that its diagnostic wrap self-test was successful, that it is not operational, that LOL is being received on X-In 2a or Y-In 3a, or that a CV burst has been detected on X-In 2a or Y-In 3a.

The diagnostic multiplexer (DIAGMUX) 37 has multiple additional inputs not shown in FIG. 2, but explained later in reference to for FIG. 5. These alternate inputs can be selected by the MP 31 for diagnostic purposes during a power-on reset initialization sequence and under direction of cedain GPIB orders received via bus 7 from the LMC.

Figure 3:
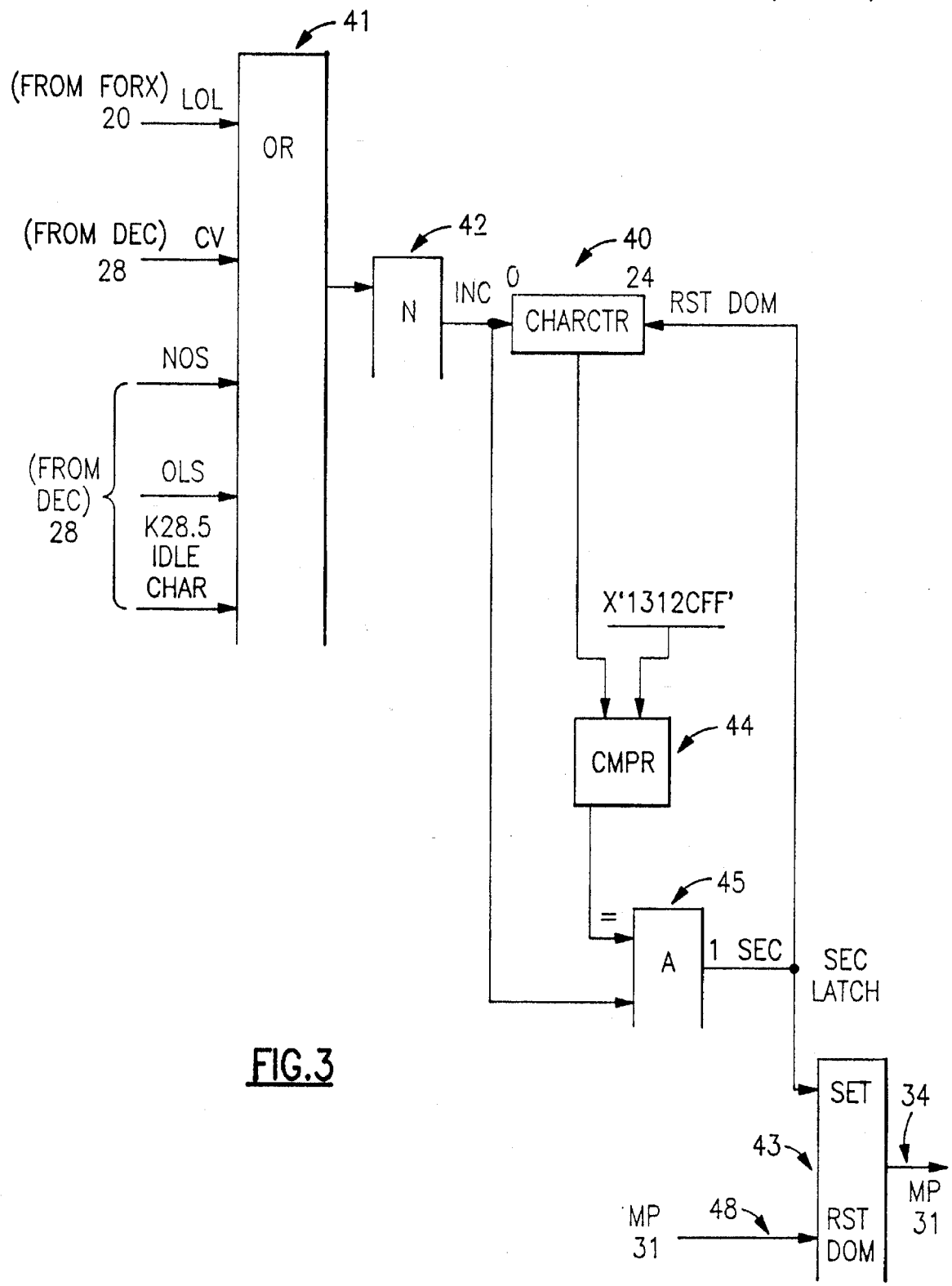
FIG. 3 shows the code interlocks for usage metering in more detail.

FIG. 3 shows the interlock controls between our repeater hardware and MP 31 for the purpose of usage metering. A non-idle character counter (CHARCTR) 40 is incremented (INC) every 50-nanosecond machine cycle if LOL is not being received, a CV is not being received, NOS is not being received, OLS is not being received, and a K28.5 (Idle) character is not being received, as determined by OR 41 and inverter (N) 42. If the CHARCTR 40 has already reached a value of 19,999,999 (×1312CFF') and another increment occurs, as determined by comparator (CMPR) 44 and AND (A) 45, then a one-second latch (SECLATH) 43 is set and the CHARCTR 40 is reset. The reset (RST DOM) to the CHARCTR 40 dominates over the increment and forces the CHARCTR 40 to zero. The SECLATH 43 being on is the "USAGE SECOND" indication 34 to the MP 31 that exactly one second's worth of nonidle usage has been accumulated, and the CHARCTR 40 has been prepared to start accumulating the next second's worth of non-idle usage. This usage metering hardware is duplicated for both paths X-In-to-Y-Out (2a to 2b) and Y-In-to-X-Out (3a to 3b). The MP 31 periodically tests the SECLATH 43 corresponding to each path, and, if either one is active, resets the active SECLATH 43 via reset 46, and increments the corresponding 3-byte seconds count contained in its LS registers. The processing speed of the MP 31 and the structure of the MP code assure that no usage seconds will be lost. The MP 31 code samples both SECLATH's much more frequently than once every second.

Figure 4:
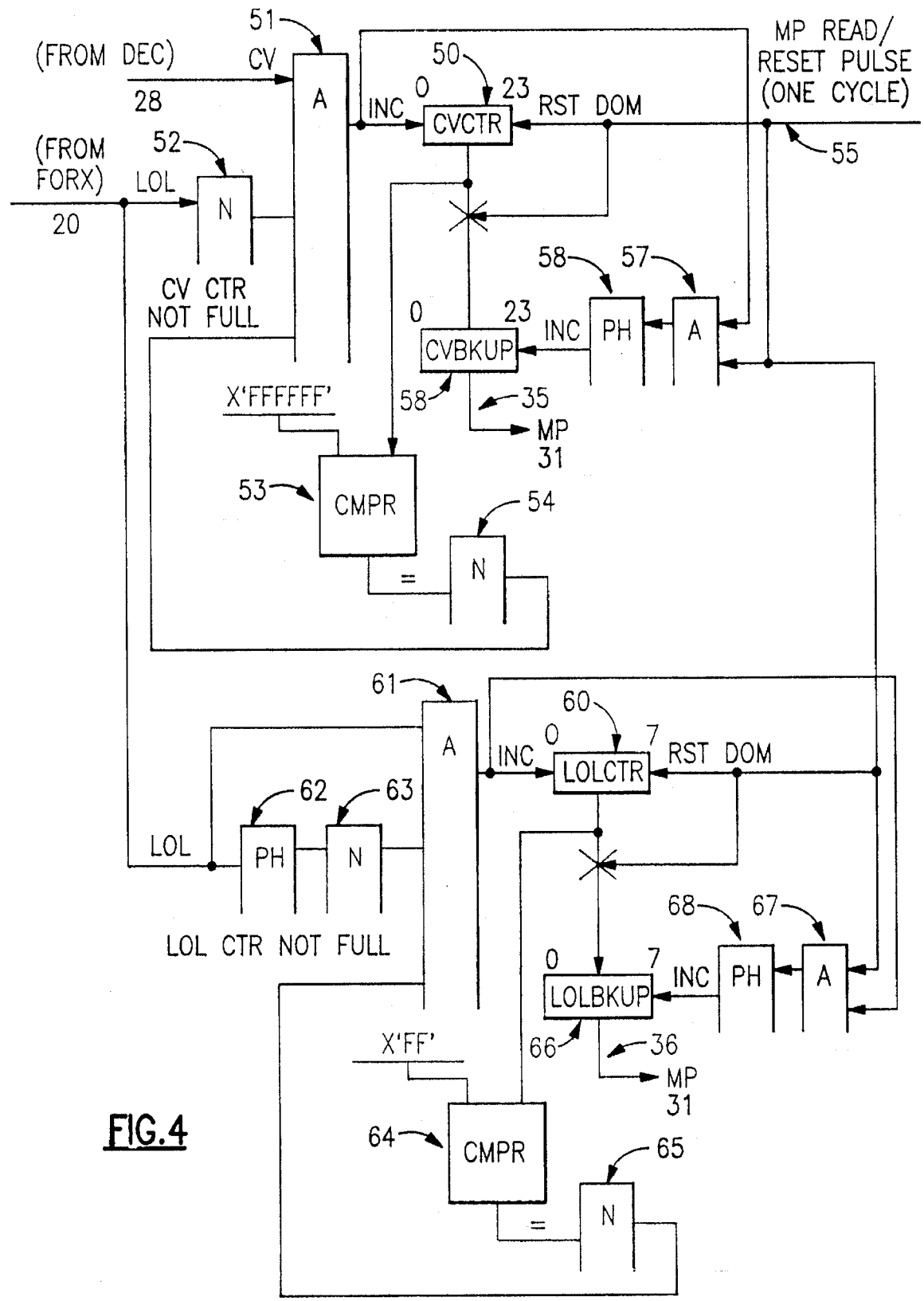
FIG. 4 shows the code interlocks for error monitoring in more detail.

FIG. 4 shows the interlock controls between the repeater error-counting hardware and MP 31 for the purpose of counting CV's and LOL off-to-on transitions. A 24-bit CV counter (CVCTR) 50 is incremented (INC) for each CV if LOL is not active and the CVCTR is not already full, as determined by AND (A) 51 and inverter (N) 52. The CVCTR 50 not full is determined by comparator (CMPR) 53 and inveder (N) 54. If the CVCTR 50 is incremented every cycle, then it will become full in approximately 0.838 second. An 8-bit LOL counter (LOLCTR) 60 is incremented (INC) for each off-to-on transition of LOL if the LOLCTR is not already full, as determined by AND (A) 61. An on-to-off transition of LOL is detected by a one-cycle polarity hold latch 62 and inverter (N) 63. When clocked, a polarity hold latch captures the slate (on or off) of the input, and holds this same state on its output for one clock cycle. If LOL is active during the current clock cycle and was inactive during the previous clock cycle, then this combination will cause the two top inputs to AND 61 to be active for one and only one clock cycle. The LOLCTR 60 not full is determined by comparator (CMPR) 64 and inverter (N) 65. It is assumed that LOL will come on rarely, and any occurrence of LOL is considered serious.

The LOLCTR 60 is capable of recording up to 255 LOL off-to-on transitions. The CV and LObtransition counting hardware is duplicated for paths X-In-to-Y-Out (2a to 2b) and Y-In-to-X-Out (3a to 3b).

The MP 31 periodically reads and resets all the hardware error counters, and adds the error counts read to the corresponding error counts contained in its LS registers. The MP 31 reads the hardware error counters by generating a read/reset signal 55, which is transformed by hardware into a pulse with a duration of exactly one RCVCLK clock cycle within each hardware domain that contains error counters. The MP 31 is clocked by a system clock (SYSCLK), which is also nominally 20 MHz (50-ns clock cycle). The SYSCLK is asynchronous to both the RCVCLK's that are generated within the domains of each repeated path, and the RCVCLK's are also asynchronous with respect to each other. The MP generates this single read/reset signal 55 to read all the CV and LObtransition counts from both the X-In-to-Y-Out (2a to 2b) and Y-In-to-X-Out (3a to 3b) paths. The following explanation only describes the reading of a CV count, but the mechanism used to read all CV counts and LOL-transition counts is identical to this description. The read/reset pulse 55 both gates the contents of the CVCTR 50 into its corresponding CV backup (CVBKUP) register 56 and resets the CVCTR 50. The reset (RST DOM) to the CVCTR 50 dominates over any increment that may also be active during this same clock cycle, and forces the CVCTR 50 to zero. However, if an increment is active during the same cycle as the read/reset pulse, then this fact is detected by AND (A) 57 and remembered for one additional cycle in the one-cycle polarity hold (PH) latch 58. The output of a one-cycle PH latch for any given cycle equals the input to the PH latch during the previous cycle. If the output of the PH latch 58 is active, then this increments (once only) the contents of the CVBKUP register 56 to compensate for the increment that coincided with the read/reset pulse and that would have otherwise been lost. The MP delays a sufficient duration of time to allow the CVBKUP register 56 to increment, if required, and then reads via bus 35 the stable contents of the CVBKUP register 56. The MP 31 adds the value read from the CVBKUP register 56 to the corresponding CV count contained in its LS registers.

Figure 5:
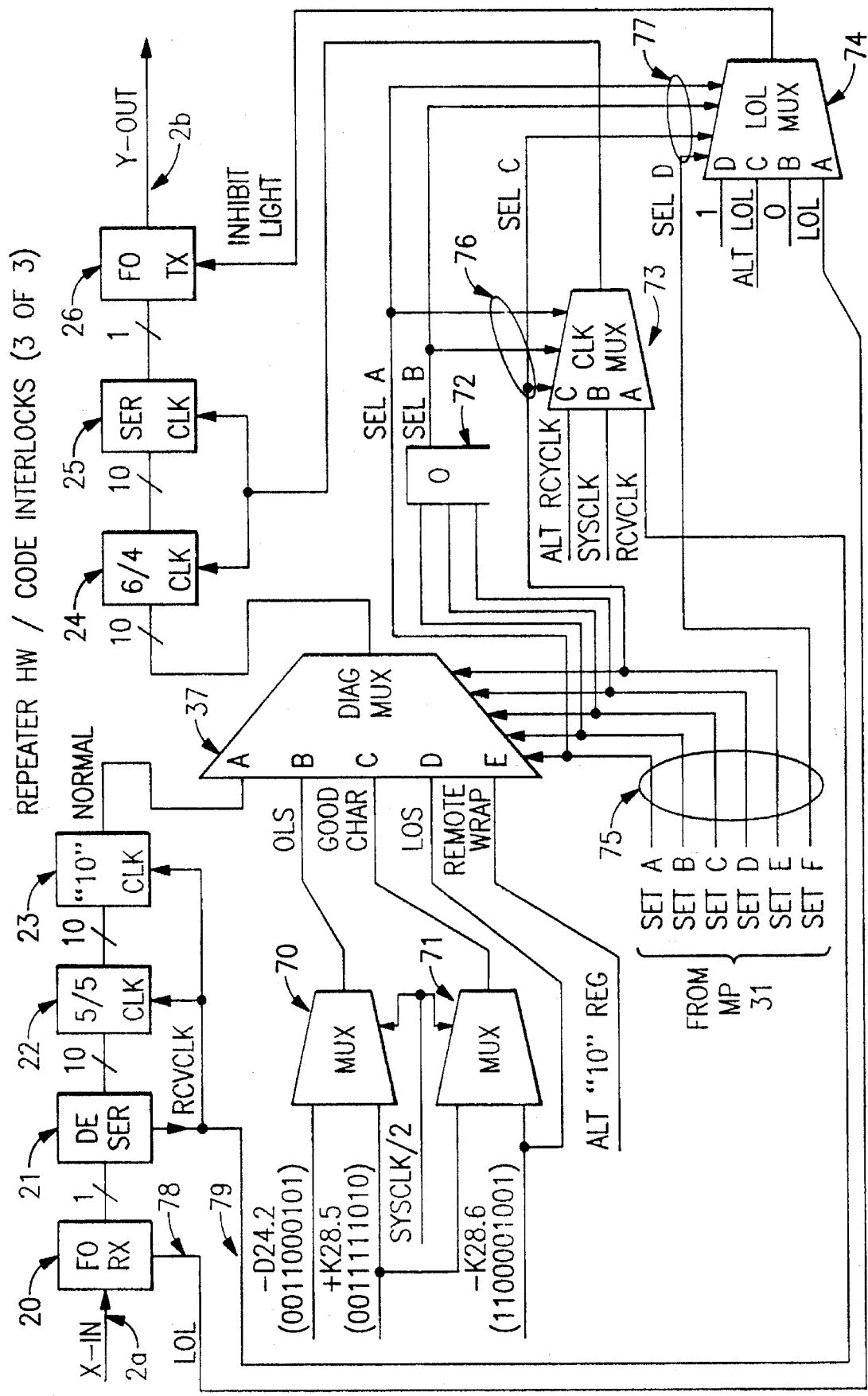
FIG. 5 shows the controls of the diagnostic multiplexer logic block of FIG. 2 in more detail.

FIG. 5 shows the interlock controls between the repeater diagnostic hardware and the MP 31 for the purpose of either allowing normal operation, forcing a particular pattern to be transmitted, or activating a remote wrap. All the hardware devices shown for the X-IN-to-Y-OUT (2a to 2b) path are duplicated for the Y-IN-to-X-OUT (3a-to-3b) path, and are controlled independently by the MP 31. Using a writeable hardware register and decoder (not shown), the MP 31 is capable of activating one and only one signal in signal group 75 (sel A, sel B, sel C, sel D, sel E or sel F).

Activating "sel A" 75 allows for normal operation by gating the "NORMAL" input A through the DIAGMUX 37. The RCVCLK 79 generated by DESER 21 drives the "⅝" register 22 and "10" register 23, and will also drive the "6/4" register 24 and SER 25 via CLKMUX 73 in normal mode. In normal mode, the signal "sel A" 75 activates "sel a" in signal group 76, which gates RCVCLK 79 input "a" through CLKMUX 73 to the "6/4" register 24 and SER 25.

Activating "sel B" 75 or "sel C" 75 or "sel D" 75 activates "sel b" 76 via OR (O) 72, which gates SYSCLK input "b"

through CLKMUX 73. The more stable SYSCLK is used for the generation of all three diagnostic patterns ("OLS", "good characters" and "LOS"), therefore SYSCLK must be gated through the CLKMUX 73 when these three diagnostic patterns are being generated.

Activating "sel B" 75 forces a diagnostic pattern of OLS to be transmitted by gating input B through DIAGMUX 37. MUX 70 generates the OLS pattern by alternating the −D24.2 (top)input and the +K28.5 (bottom)input every other SYSCLK cycle. The "SYSCLK/2" gate to MUX 70 and to MUX 71 is active every other (alternate) SYSCLK clock cycle. The repeated alternating sequence of D24.2 and K28.5 is defined as the OLS sequence by the ESCON Architecture, and indicates an offline condition to an attached ESCON serial component. Receiving OLS prior to detection of a link failure condition will prevent an ESCON serial component from reporting a link incident as a result of the link failure. The ESCON Architecture defines that a link failure must be detected if an LOS or LOL condition persists for longer than one second. The capability of sending OLS via the repeater's DIAGMUX 37 is useful during link problem determination, and is also useful to test the OLS-detection capabilities of other attached repeaters and ESCON serial components.

Activating "sel C" 75 forces a diagnostic pattern of "good characters" to be transmitted by gating input "C" through DIAGMUX 37. MUX 71 generates the "good characters" pattern by alternating the +K28.5 (top) input and the −K28.6 (bottom) input every other SYSCLK cycle similar to the operation of MUX 70. This "good characters" pattern can be used to test the usage metering capabilities of other repeaters, because this pattern is not OLS, is not NOS, and contains non-idle characters (K28.6's).

Activating "sel D" 75 forces an "LOS" diagnostic pattern of repeated −K28.6's to be transmitted by gating input "D" through DIAGMUX 37. Since the −K28.6 10-bit transmission code contains an unequal number of ones (4) and zeros (6), then this should cause the receiver of this pattern to detect continuous CV's because the 8/10-code running disparity will constantly be driven beyond the acceptable limits. Detecting continuous CV's should rapidly cause LOS to be detected, hence this diagnostic pattern is referred to as the "LOS" pattern. This "LOS" pattern can be used to test the LOS-detection and CV-counting capabilities of other repeaters.

Activating "sel E" 75 activates the remote wrap function by gating the "remote wrap" input "E" through DIAGMUX 37. This "remote wrap" input "E" comes from the output of the alternate "10" register, which is the "10" register in the alternate path Y-IN-to-X-OUT (3a-to-3b) corresponding to "10" register 23. This transmits on Y-OUT 2b whatever is being received on Y-IN 3a, hence the "remote wrap" connotation. Activating "sel E" 75 also activates the "sel c" 76 gate to CLKMUX 73, which gates the alternate RCVCLK input "c" through CLKMUX 73 to the "6/4" register 24 and SER 25. The alternate RCVCLK is the RCVCLK generated by the DESER in path Y-IN-to-X-OUT (3a-to-3b) which corresponds to RCVCLK 79 generated by DESER 21. This alternate RCVCLK must be used to synchronize the entire remote wrap path and maintain integrity of the repeated serial bit stream. Placing our repeater in remote wrap mode can facilitate problem determination of the attached serial component and link that are remotely wrapped through the repeater.

The output of LOLMUX 74 controls the INHIBIT LIGHT signal to FOTX 26. Activating INHIBIT LIGHT causes FOTX 26 to stop transmitting light, which should cause the attached serial component to detect LOL. Activating "sel A" 75 activates the "sel a" 77 gate to LOLMUX 74, which gates the LOL 78 input "a" through LOLMUX 74. Gating LOL 78 to FOTX 26 assures that no-light received results in no-light transmitted for the normal path. Activating either "sel B" 75, "sel C" 75 or "sel D" 75 activates, via OR 72, the "sel b" 77 gate to LOLMUX 74, which gates the "0" input "b" through LOLMUX 74. This "0" input is an inactive level, and assures that INHIBIT LIGHT is held inactive when transmitting the diagnostic patterns "OLS", "good characters" and "LOS". Activating "sel E" 75 activates the "sel c" 77 gate to LOLMUX 74, which gates the alternate LOL input "c" through LOLMUX 74 to the FOTX 26. The alternate LOL is the LOL generated by the FORX in path Y-IN-to-X-OUT (3a-to-3b) which corresponds to FORX 20. This alternate LOL must be used to propagate no-light received to no-light transmitted through the remote wrap path.

Activating "sel F" 75 forces the diagnostic transmission of no-light. Activating "sel F" 75 activates the "sel d" 77 gate to LOLMUX 74, which gates the "1" input "d" through LOLMUX 74. This "1" input is an active level, and assures that INHIBIT LIGHT is held active during the diagnostic transmission of no-light. Note that the data being passed through DIAGMUX 37 and clock being passed through CLKMUX 73 are both unimpodant during the diagnostic transmission of no-light, because no serial bit stream is being transmitted.

Computer system implementation.

With our repeater units, elements of a distributed computer system which has a client and server can be configured over larger distances. The configured system will solve the problems noted above. Such a system will have a serial channel for executing a channel program for data transfers ("ESCON Channel" in FIG. 1) and a serial interface connecting said serial channel with another serial component which conforms to a predetermined protocol (1 in FIG. 1). One or more repeater units will connect into the serial link between the serial channel and other serial component (any "REPEATER" in FIG. 1), and will repower the serial bit streams passing in both directions on the serial link (20, 21, 22, 23, 37, 24, 25&26 in FIG. 2). The repeater unit, in accordance with our preferred embodiment will have a monitor for measuring and reporting non-idle usage of the serial link in both directions (FIGS. 2&3).

The repeater unit will have a way of interrogating the serial characters flowing in the serial link (20, 21, 22, 23, 27&28 in FIG. 2), and of decoding said serial characters as valid (28 in FIG. 2) and either idle or non-idle characters according to the protocol of the serial link (29 in FIG. 2), and provide a counter for counting up to one second's worth of non-idle characters according to the nominal serialization time of each serial character (41, 42, 40, 44&45 in FIG. 3). The system will detect when exactly one second's worth of non-idle characters have been counted (44&45 in FIG. 3), will indicate to a higher-level recording means (31 in FIG. 2) within the repeater the fact that one second's worth of non-idle characters have been counted (43 in FIG. 3 and 34 in FIGS. 3&2), and will reset the counter in such a manner that no non-idle characters can be repeated without being counted (42, 40, 44&45 in FIG. 3). The recorder, preferably in the form of a microprocessor 31 in FIG. 2, will rapidly detect an indication that one second's worth of non-idle characters have been counted (34 in FIGS. 2&3). The microprocessor will then reset the indicator (46 in FIG. 3) and will increment a seconds counter capable of holding several months worth of seconds. The microprocessor will respond to a request to read and reset the seconds counts from a monitoring device external to the repeater via a bus (7 in FIGS. 2&1), passing the seconds counts to the external monitoring device, and resetting the seconds counts after passing them to the external monitoring device.

Any repeater unit will also provide error monitoring by counting and reporting both all serial characters having bit errors and all loss-of-light transitions detected in both directions of the serial link (FIGS. 2&4).

In this embodiment, the repeater unit will interrogate the serial characters flowing in the serial link (20, 21, 22, 23, 27&28 in FIG. 2), and provide for decoding said serial characters and detecting whether a decoded serial character contains one or more bits in error known as a code violation (28&30 in FIG. 2) Upon detection of such code violations the repeater unit will provide for incrementing a code violation counter capable of holding a very large count of code violations if loss-of-light is inactive and said counter is not full (51, 52, 50, 53&54 in FIG. 4). The repeater provides via a microprocessor, a higher-level recording means (31 in FIG. 2) to rapidly read and reset the code violation counters (55 in FIG. 4) in such a manner that each code violation detected will be counted once and only once and a code violation cannot occur without being counted (50, 57, 58, 56&35 in FIG. 4). The microprocessor which provides a higher-level recording means is capable of 1. adding the code violation counts read to its larger code violation accumulation counters, 2. responding to a request to read and reset the code violation accumulation counts from a monitoring device external to the repeater via a bus (7 in FIGS. 2&1), 3. passing the code violation accumulation counts to said external monitoring device, and 4. resetting the code violation accumulation counts after passing them to the external monitoring device.

Preferably, the repeater unit will detect loss-of-light from either direction in the serial link (20 in FIG. 2) and will have a way of detecting that loss-of-light has transitioned from the off state to the on state (62&63 in FIG. 4) and for incrementing a loss-of-light transition counter capable of holding a large count of loss-of-light transitions if an off-to-on loss-of-light transition is detected and said counter is not full (61, 60, 64&65 in FIG. 4). The microprocessor will provide a higher-level recording means (31 in FIG. 2) to rapidly read and reset the loss-of-light transition counter (55 in FIG. 4) in such a manner that each of r-to,on loss-of-light transition detected will be counted once and only once and an off-to-on loss-of-light transition cannot occur without being counted (60, 67, 68, 66&36 in FIG. 4).

Said higher-level recording means is capable of 1. adding the loss-of-light transition counts read to its loss-of-light transition accumulation counters, 2. responding to a request to read and reset the loss-of-light transition accumulation counts from a monitoring device external to the repeater via a bus (7 in FIGS. 2&1), 3. passing the loss-of-light transition accumulation counts to said external monitoring device, and 4. resetting the loss-of-light transition accumulation counts after passing them to the external monitoring device.

Any repeater unit will also provide diagnostics by independently generating and transmitting multiple diagnostic serial bit patterns or no-light in both directions of the serial link (FIG. 5). The repeater will provide means to diagnostic wrap either the serial bit stream or no-light condition received from an attached serial component as the same serial bit stream or no-light condition, as appropriate, transmitted back to the same attached serial component.

For diagnostics, the microprocessor, in the form of a higher-level recording means (31 in FIG. 2), activates various diagnostic transmissions independently into either or both directions of the repeated serial link (FIG. 5), including:

1. An architected special continuous sequence indicating an offline condition (75(sel B), 37(B), 70, 24, 25&26 in FIG. 5), 2. A repeated pattern of alternating idle and non-idle characters (75(sel C), 37(C), 71, 24, 25&26 in FIG. 5), 3. A repeated pattern capable of causing both code violations and a loss-of-character-synchronization condition in the receiver (75(sel D), 37(D), 24, 25&26 in FIG. 5), or 4. No-light (75 (sel F), 77 (sel d), 74(d)&26 in FIG. 5).

The repeater unit substitutes stable system clocks for usage during all of the aforementioned diagnostic transmissions except the diagnostic transmission of no-light, which requires no clocking (75(sel B or C or D), 72, 76(sel b)& 73(b) in FIG. 5), and inhibits the transmission of no-light regardless of no light being received during all of the aforementioned diagnostic transmissions except the diagnostic transmission of no-light (75(sel B or C or D), 72, 77(sel b)&74(b)in FIG. 5).

For a remote wrap, the repeater unit microprocessor (31 of FIG. 2) activates an alternate diagnostic remote wrap mode independently on either side or both sides of the repeater. A serial bit pattern or no-light condition received from an attached serial component is transmitted unchanged as the same serial bit pattern or no-light condition back to the same attached serial component that either originated or repowered the serial bit pattern or no-light condition (75(sel E), 37(E), 24, 25&26 in FIG. 5). The remote wrap mode retransmits the wrapped serial bit stream at the same serial bit frequency as the serial bit frequency of the received serial bit stream (75(sel E), 76(sel c), 73(c), 24&25 in FIG. 5), and transmits no-light if no-light is being received from the remote wrap path instead of from the normal repeated path (75(sel E), 77(sel C), 74(c)&26 in FIG. 5).

Our invention will be used for a 9036 Remote Channel Extender, which allows customers to use fiber optic links provided by a carrier, to sites up to 80 kilometers away. A TCP/IP gateway will allow this protocol to be used to interconnect devices via ESCON and FCSI. As a result, ESCON (including its functionally equivalent FCSI portion) can permit a mainframe to act as if it were a client-server and perform client-server applications with remote devices. The IBM mainframe, as a result, has the capacity to act an a hierarchical mainframe in the traditional sense, but also as a server, both for other servers and clients, in a distributed environment that can have elements many miles away. These processors can work in parallel with general purpose mainframes. The 9036 Remote Channel Extender allows connecting processor at distances of up to 80 kilometers using ESCON and the fiber lines of common (e.g. RBOC) carriers.

While we have described our preferred embodiments of our invention, it will be understood that those skilled in the ad, both now and in the future, may make various improvements and enhancements which fall within the scope of the claims which follow. These claims should be construed to maintain the proper protection for the invention first disclosed.

What is claimed is:

1. An apparatus for use with a serial channel interface connecting a serial channel with a serial component, said serial channel interface conforming to a predetermined protocol which includes the insertion of idle characters in a serial bit stream between non-idle characters, a certain quantity of said non-idle characters transmitted in a serial link representing use of the serial link, comprising:

a repeater unit having means for connecting the repeater unit into the serial link between the serial channel and the serial component, said repeater unit having means for repowering a plurality of serial bit streams conforming to said predetermined protocol passing in both directions on the serial link, and wherein the repeater unit includes means for measuring and reporting said certain quantity of non-idle characters repowered in said plurality of serial bit streams.

2. The apparatus according to claim 1 wherein the repeater unit includes recording means within the repeater for recording and processing data and further includes, means for interrogating serial characters flowing in the serial link, and, means for decoding said serial characters for validity and either idle or non-idle serial characters, according to the protocol of the serial link, and means for counting a number of valid and non-idle serial characters, which, in accordance with the nominal serialization time of each serial character, is equivalent, to one time period, and, means for detecting when said number of valid and non-idle serial characters corresponding to said one time period have been counted, indicating to said recording means within the repeater the fact that said number of valid and non-idle serial characters corresponding to said one time period have been counted and for resetting said means for counting in such a manner that no valid and non-idle serial characters can be repeated without being counted.

3. The apparatus according to claim 2 wherein said one time period for said counting means and said detecting means is equal to one second, and wherein the repeater unit recording means provides means for:

a. rapidly detecting said indication that said number of valid and non-idle serial characters corresponding to one second have been counted, b. resetting said indication, c. incrementing a seconds counter capable of holding several months worth of seconds.

4. The apparatus according to claim 2 wherein the repeater unit is connected to an external monitoring device via a bus, and wherein said repeater unit recording means provides means for:

a. responding to a request from said external monitoring device to read and reset a plurality of seconds counts, b. passing the seconds counts to said external monitoring device, and c. resetting the seconds counts after passing them to said external monitoring device.

5. The apparatus according to claim 2 wherein the repeater unit further includes, means for comparing said count of each valid and non-idle serial character with a value equal to the number of valid and non-idle serial characters corresponding to said one time period, based on the nominal serialization time of each serial character, and, means for reporting when said number of valid and non-idle serial characters counted is equal to said value for said comparing means.

6. An apparatus for use with a serial channel interface connecting a serial channel with a serial component, said serial channel interface conforming to a pre-determined protocol which includes the insertion of idle characters in a serial bit stream between non-idle characters, a certain quantity of said non-idle characters transmitted in a serial link representing use of the serial link, comprising:

a repeater unit having means for connecting the repeater unit into the serial link between the serial channel and the serial component, said repeater unit having means for repowering a plurality of serial bit streams conforming to said predetermined protocol passing in both directions on the serial link, and wherein the repeater unit includes means for measuring and reporting said certain quantity of non-idle characters repowered in said plurality of serial bit streams and further includes a decoder, a counter, a comparator, and reporting latch.

7. The apparatus according to claim 6 wherein the repeater unit includes recording means within the repeater for recording and processing data and further includes, means for interrogating serial characters flowing in the serial link, and, means for decoding said serial characters for validity and either idle or non-idle characters, according to the protocol of the serial link, and means for counting a number of valid and non-idle serial characters, which, in accordance with the nominal serialization time of each serial character, is equivalent to one time period, and, means for detecting when exactly said number of valid and non-idle serial characters corresponding to said one time period have been counted, indicating to said recording means within the repeater the fact that said number of valid and non-idle serial characters corresponding to said one time period been counted and for resetting said means for counting in such a manner that no valid and non-idle serial characters can be repeated without being counted.

8. The apparatus according to claim 7 wherein said one time period for said counting means and said detecting means is equal to one second, and wherein the repeater unit recording means provides means for:

a. rapidly detecting said indication that said number of valid and non-idle serial characters corresponding to one second have been counted, b. resetting said indication, c. incrementing a seconds counter capable of holding several months' worth of seconds.

9. The apparatus according to claim 7 wherein the repeater unit is connected to an external monitoring device via a bus, and wherein said repeater unit recording means provides means for:

a. responding to a request from said external monitoring device to read and reset a plurality of seconds counts, b. passing the seconds counts to said external monitoring device, and c. resetting the seconds counts after passing them to said external monitoring device.

10. The apparatus according to claim 7 wherein the repeater unit further includes, means for comparing said count of each valid and non-idle serial character with a value equal to the number of valid and non-idle serial characters corresponding to said one time period, based on the nominal serialization time of each serial character, and, means for reporting when said number of valid and non-idle serial characters counted is equal to said value for said comparing means.

11. An apparatus for use with a serial channel interface connecting a serial channel with a serial component, said serial channel interface conforming to a pre-determined protocol which includes the insertion of idle characters in a serial bit stream between non-idle characters, a certain quantity of said non-idle characters transmitted in a serial link representing use of the serial link, comprising:

means for interrogating serial characters flowing in the serial link, and means for decoding said serial characters for validity and either idle or non-idle characters, according to the protocol of the serial link, and means for counting a number of valid and non-idle characters, which, in accordance with the nominal serialization time of each serial character, is equivalent to one time period, and means for detecting when exactly said number of valid and non-idle serial characters have been counted, means for reporting the fact that said number of valid and non-idle serial characters corresponding to one time period have been counted, means for resetting said counting means in such a manner that all valid and non-idle serial characters flowing in the serial link are counted.

* * * * *

UNITED STATES PATENT AND TRADEMARK OFFICE
CERTIFICATE OF CORRECTION

PATENT NO. : 5,517,519
DATED : May 14, 1996
INVENTOR(S): Quiedo J. Carbone, Jr. et al.

It is certified that error appears in the above-identified patent and that said Letters Patent are hereby corrected as shown below:

| | |
|---|---|
| Col. 6, line 5 | "pod" should be --port--. |
| Col. 8, line 49 | "second" should be --first--. |
| line 53 | "repater" should be --repeater--. |
| Col. 11, line 19 | delete "for". |

Signed and Sealed this

Twenty-second Day of October, 1996

Attest:

BRUCE LEHMAN

*Attesting Officer*      *Commissioner of Patents and Trademarks*